US012573255B2

(12) United States Patent
Kawamata

(10) Patent No.: US 12,573,255 B2
(45) Date of Patent: Mar. 10, 2026

(54) COIN HANDLING APPARATUS AND COIN HANDLING METHOD

(71) Applicant: GLORY LTD., Hyogo (JP)

(72) Inventor: Akihisa Kawamata, Hyogo (JP)

(73) Assignee: GLORY, LTD., Hyogo (JP)

( * ) Notice: Subject to any disclaimer, the term of this patent is extended or adjusted under 35 U.S.C. 154(b) by 0 days.

(21) Appl. No.: 18/944,024

(22) Filed: Nov. 12, 2024

(65) Prior Publication Data

US 2025/0157276 A1 May 15, 2025

(30) Foreign Application Priority Data

Nov. 15, 2023 (JP) ................................ 2023-194419

(51) Int. Cl.

*G07D 11/00* (2019.01)
*G07D 11/14* (2019.01)
*G07D 11/237* (2019.01)
*G07D 11/32* (2019.01)

(52) U.S. Cl.

CPC ........... *G07D 11/009* (2013.01); *G07D 11/14* (2019.01); *G07D 11/237* (2019.01); *G07D 11/32* (2019.01); *G07D 2201/00* (2013.01)

(58) Field of Classification Search

CPC .... G07D 11/009; G07D 11/14; G07D 11/237; G07D 11/32; G07D 2201/00; G07D 3/14; G07D 11/235; G07D 11/34; G07D 1/00

See application file for complete search history.

(56) References Cited

U.S. PATENT DOCUMENTS

2008/0142583 A1* 6/2008 Yokoi ..................... G07F 19/20 902/9
2013/0105271 A1* 5/2013 Ikegami ............... B65H 31/309 194/302
2017/0221294 A1* 8/2017 Niizuma .................. G07D 5/08

FOREIGN PATENT DOCUMENTS

EP 4246474 A1 9/2023
JP 2021149760 A * 9/2021 ............. G07D 9/008
JP 2021-189534 A 12/2021
WO 2010046992 A1 4/2010

OTHER PUBLICATIONS

Extended European Search Report for application No. 24212841.1, dated May 23, 2025.

* cited by examiner

*Primary Examiner* — Tuyen K Vo
(74) *Attorney, Agent, or Firm* — Shih IP Law Group, PLLC.

(57) ABSTRACT

A coin handling apparatus includes a first storage that stores one or more coins, is equipped with a door, and configured to discharge the stored one or more coins by opening the door; a transport unit that transports the one or more coins discharged; a recognition unit that recognizes the one or more coins transported; and a control unit that, in response to receiving a withdrawal instruction, executes control to open the door and, based on a recognition result, to control the transport unit to transport one or more withdrawal target coins to a withdrawal unit, the one or more withdrawal target coins being among the one or more coins discharged from the first storage. When the control unit determines in the control that not all of the one or more coins have been discharged from the first storage, the control unit executes retry control to open the door again.

14 Claims, 9 Drawing Sheets

19

| DATE | OPERATION | FIRST STORAGE | | | | | | SECOND STORAGE | | | | | |
|---|---|---|---|---|---|---|---|---|---|---|---|---|---|
| | | 500 YEN | 100 YEN | 50 YEN | 10 YEN | 5 YEN | 1 YEN | 500 YEN | 100 YEN | 50 YEN | 10 YEN | 5 YEN | 1 YEN |
| October 20th 15:00 | WITHDRAWAL PREPARATION | ONE COIN | FOUR COINS | ONE COIN | FOUR COINS | ONE COIN | FOUR COINS | ** COINS | ** COINS | ** COINS | ** COINS | ** COINS | ** COINS |
| October 20th 15:30 | WITHDRAWAL | ZERO COIN | ONE COIN | ONE COIN | FOUR COINS | ONE COIN | FOUR COINS | ** COINS | ** COINS | ** COINS | ** COINS | ** COINS | ** COINS |
| October 20th 15:31 | WITHDRAWAL PREPARATION | ONE COIN | FOUR COINS | ONE COIN | FOUR COINS | ONE COIN | FOUR COINS | ** COINS | ** COINS | ** COINS | ** COINS | ** COINS | ** COINS |
| . . . | . . . | . . . | . . . | . . . | . . . | . . . | . . . | . . . | . . . | . . . | . . . | . . . | . . . |

FIG. 5

COIN HANDLING APPARATUS AND COIN HANDLING METHOD

CROSS REFERENCE TO RELATED APPLICATIONS

This application is entitled and claims the benefit of Japanese Patent Application No. 2023-194419, filed on Nov. 15, 2023, the disclosure of which including the specification, drawings and abstract is incorporated herein by reference in its entirety.

TECHNICAL FIELD

The present disclosure relates to a coin handling apparatus and a coin handling method.

BACKGROUND ART

Conventionally, coin handling apparatuses that perform various processing such as depositing or withdrawing coins has been put into practical use. For example, in a coin handling apparatus, when coins are discharged from a storage in response to a withdrawal instruction, the coins are transported to a withdrawal port or the like by a transport unit. Here, it is required that the storage reliably discharges the coins.

As one example, a coin handling apparatus is provided with a receiving tray for storing coins, a gate part for opening and closing the bottom surface of the receiving tray, and a vibration imparting mechanism for applying vibration to the receiving tray, thereby preventing the remaining of a coin in the receiving tray.

SUMMARY

A coin handling apparatus according to one aspect of the present disclosure comprises: a first storage that stores one or more coins, comprises a door configured to be opened and closed, and discharges the stored one or more coins by opening the door; a transport unit that transports the one or more coins discharged from the first storage; a recognition unit that recognizes the one or more coins transported by the transport unit; and a control unit that, in response to receiving a withdrawal instruction, executes withdrawal control to open the door and, based on a recognition result by the recognition unit, to control the transport unit to transport one or more withdrawal target coins to a withdrawal unit, the one or more withdrawal target coins being among the one or more coins discharged from the first storage, in which when the control unit determines in the withdrawal control that not all of the one or more coins have been discharged from the first storage based on the number of the one or more coins recognized by the recognition unit, the control unit executes retry control to open the door again.

BRIEF DESCRIPTION OF DRAWINGS

FIG. 5 illustrates an example of storage information of coins;

DESCRIPTION OF EMBODIMENTS

Figure 1:
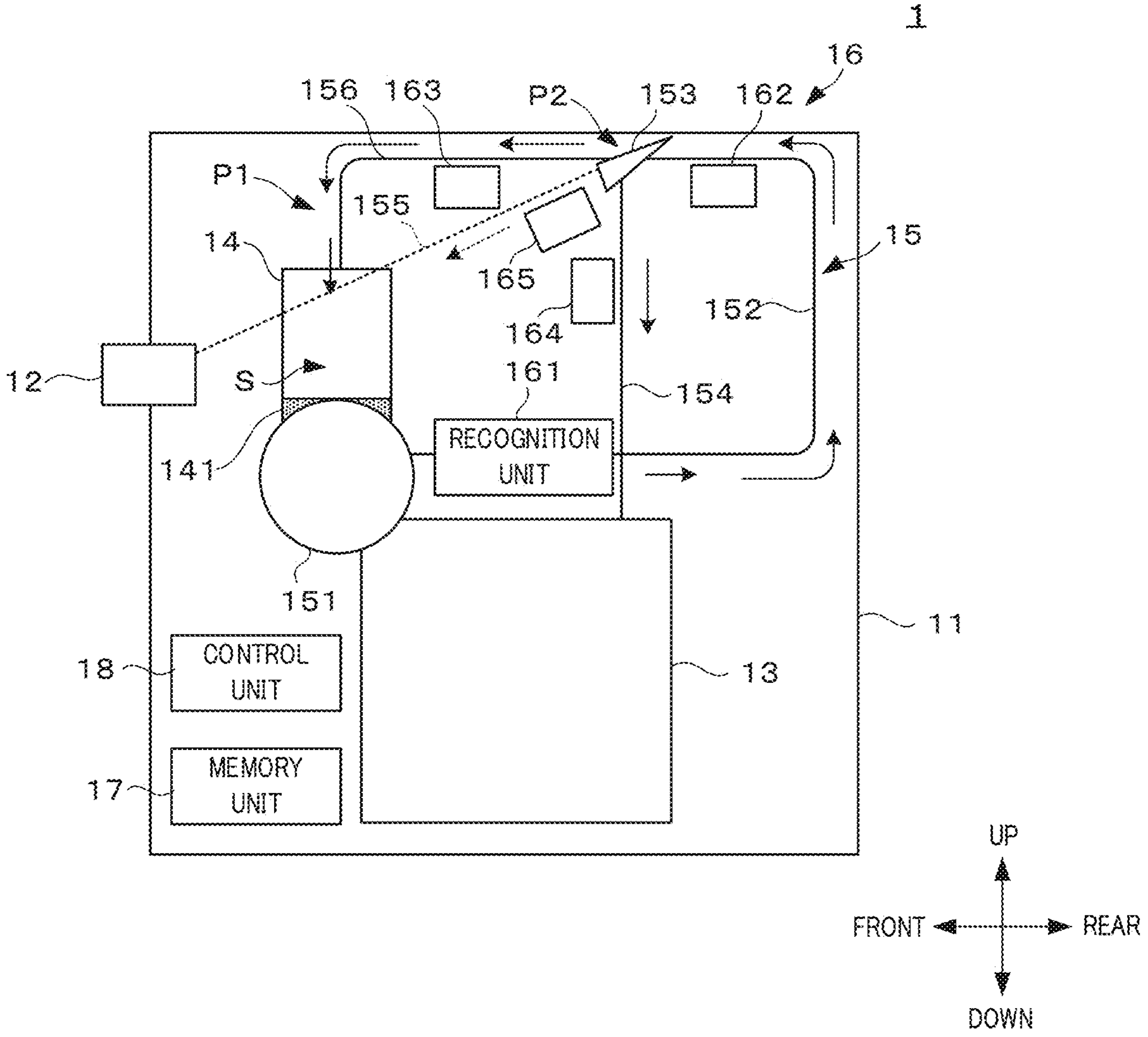
FIG. 1 illustrates an example of the configuration of a coin handling apparatus.

A conventional coin handling apparatus applies vibration to the receiving tray by a vibration imparting mechanism when a residual sensor detects coins remaining in the receiving tray. Therefore, it is necessary to provide a residual sensor to detect coins, which may complicate the configuration of the coin handling apparatus.

An object of the present disclosure is to provide a coin handling apparatus and a coin handling method that easily reduce the remaining of a coin in a storage.

A coin handling apparatus according to one aspect of the present disclosure comprises: a first storage that stores one or more coins, comprises a door configured to be opened and closed, and discharges the stored one or more coins by opening the door; a transport unit that transports the one or more coins discharged from the first storage; a recognition unit that recognizes the one or more coins transported by the transport unit; and a control unit that, in response to receiving a withdrawal instruction, executes withdrawal control to open the door and, based on a recognition result by the recognition unit, to control the transport unit to transport one or more withdrawal target coins to a withdrawal unit, the one or more withdrawal target coins being among the one or more coins discharged from the first storage, in which when the control unit determines in the withdrawal control that not all of the one or more coins have been discharged from the first storage based on the number of the one or more coins recognized by the recognition unit, the control unit executes retry control to open the door again.

According to a coin handling apparatus according to one aspect of the present disclosure, the control unit may determine that not all of the one or more coins have been discharged from the first storage based on the number of the one or more coins recognized by the recognition unit per denomination.

A coin handling apparatus according to one aspect of the present disclosure further comprises: a memory unit that records information regarding the number of coins to be stored in the first storage, in which when the number of the one or more coins recognized by the recognition unit differs from the number of coins recorded in the memory unit, the control unit may determine that not all of the one or more coins have been discharged.

According to a coin handling apparatus of one aspect of the present disclosure, when the control unit executes the withdrawal control, the control unit may record, in the memory unit, information regarding the number of the one or more coins stored in the first storage based on the number of the withdrawn coins.

A coin handling apparatus of one aspect of the present disclosure further comprises: a second storage that stores the one or more coins, in which the control unit may execute withdrawal preparation control to discharge a coin among the one or more coins from the second storage to the transport unit and to control the transport unit based on the recognition result by the recognition unit in such a way that a predetermined number of coins are stored in the first storage; and when the withdrawal preparation control is executed, the memory unit may record information regarding the number of the one or more coins stored in the first storage, based on the number of the one or more coins recognized by the recognition unit.

According to a coin handling apparatus of one aspect of the present disclosure, the memory unit may have recorded therein information regarding the number of coins stored in the second storage.

According to a coin handling apparatus of one aspect of the present disclosure, the control unit may detect an operation time of a closing operation for closing the door.

According to a coin handling apparatus of one aspect of the present disclosure, the transport unit may comprise a transport path for transporting the one or more coins, and a feeding unit that feeds the one or more coins to the transport path; and the first storage may be provided above the feeding unit.

According to a coin handling apparatus of one aspect of the present disclosure, the control unit may change the withdrawal control depending on whether the withdrawal instruction corresponds to a time-priority processing instruction set in advance.

According to a coin handling apparatus of one aspect of the present disclosure, the control unit may set a fewer number of times for opening and closing the first storage when the withdrawal instruction corresponds to the time-priority processing instruction than when the withdrawal instruction does not correspond to the time-priority processing instruction.

According to a coin handling apparatus of one aspect of the present disclosure, the control unit may determine whether the door of the first storage has opened properly based on a closing time for closing the door.

According to a coin handling apparatus of one aspect of the present disclosure, when the control unit determines that the withdrawal instruction does not correspond to the time-priority processing instruction and that the door of the first storage has not opened properly, the control unit may execute the retry control.

According to a coin handling apparatus of one aspect of the present disclosure, during the withdrawal control, when the control unit determines that not all of the one or more coins have been discharged from the first storage, the control unit does not have to execute the retry control when the one or more withdrawal target coins are being transported to the withdrawal unit.

According to a coin handling apparatus of one aspect of the present disclosure, during the withdrawal control, when the control unit determines that not all of the one or more coins have been discharged and that the number of the one or more withdrawal target coins corresponds to an amount in the withdrawal instruction, the control unit may associate information indicating that the number of the one or more coins is unclear to the information regarding the number of coins recorded in the memory unit.

A coin handling method of one aspect of the present disclosure comprises: opening a door of a storage storing one or more coins to discharge the one or more coins from the storage, in response to receiving a withdrawal instruction; transporting by a transport unit the one or more coins discharged from the storage; recognizing by a recognition unit the one or more coins transported by the transport unit; opening the door again when not all of the one or more coins have been discharged from the storage based on the number of the one or more coins recognized by the recognition unit; and transporting a withdrawal target coin to a withdrawal unit by the transport unit based on a recognition result by the recognition unit, the withdrawal target coin being among the one or more coins discharged from the storage.

The present disclosure can easily reduce the remaining of a coin in a storage.

Hereinafter, each embodiment of the present disclosure will be described in detail with reference to the drawings. However, detailed descriptions of already well-known matters and redundant descriptions of substantially the same configurations may be omitted. In addition, in the embodiments, the same reference numerals are given to the common configurations, and redundant description may be omitted.

Embodiment 1

[Configuration Example of Coin Handling Apparatus 1]

FIG. 1 illustrates an example of the configuration of a coin handling apparatus 1. Coin handling apparatus 1 comprises a housing 11, a withdrawal unit 12, a second storage 13, a first storage 14, a transport unit 15, a recognition device 16, a memory unit 17, and the control unit 18.

In the following description of the coin handling apparatus 1, description may be given using the front-rear direction and the up-down direction (i.e., vertical direction) illustrated in FIG. 1. The front-rear direction illustrated in FIG. 1 is defined such that when the side where the withdrawal unit 12 of the coin handling apparatus 1 is disposed is the front side, and the side where the second storage 13 is disposed is the rear side. Additionally, the vertical direction illustrated in FIG. 1 is the direction when the coin handling apparatus 1 is installed.

It should be noted that the front-rear and vertical directions illustrated in FIG. 1 are defined for explanatory purposes and are not intended to specify the front-rear and vertical directions of the coin handling apparatus related to the present disclosure. That is, the coin handling apparatus related to the present disclosure does not necessarily have to be installed according to the front-rear and vertical directions as illustrated in FIG. 1.

The housing 11 is configured to accommodate the units and the like of the coin handling apparatus 1.

The withdrawal unit 12 is an opening for dispensing coins to the outside of the coin handling apparatus 1. The withdrawal unit 12 is connected to the transport unit 15. Additionally, the housing 11 may be equipped with a deposit unit that accepts deposits from outside the coin handling apparatus 1. For example, the deposit unit can be connected to the transport unit 15 to supply the deposited coins to the transport unit 15.

The second storage 13 stores coins to be handled by the coin handling apparatus 1. The second storage 13 is configured to store more coins than the first storage 14. The second storage 13 can store coins of a plurality of denominations in a mixed state, for example.

Furthermore, based on the control of the control unit 18, the second storage 13 discharges the stored coins to the transport unit 15. For example, the coins discharged from the second storage 13 are supplied to the first storage 14 and the like by the transport unit 15. In addition, the second storage 13 may be configured, for example, to be removable from the coin handling apparatus 1. For example, a handle for gripping to remove the second storage from the coin handling apparatus 1 may be provided on the outer surface of the second storage 13.

The first storage 14 stores coins to be handled by the coin handling apparatus 1. Specifically, based on the control of the control unit 18, the first storage 14 can temporarily store a specified number of coins as a reserve for the next withdrawal. The first storage 14 can store coins of a plurality of denominations in a mixed state, for example. For example, the coins stored in the first storage 14 may be used as change reserve.

In addition, the first storage 14 is equipped with a door (shutter) that can be opened and closed, and the first storage 14 is configured in such a way that coins are discharged from a storage room S by opening the door. For example, the first storage 14 comprises a shutter 141 that opens and closes the storage room S based on the control of the control unit 18. The first storage 14 stores coins so that the coins accumulate on the shutter 141, and when the shutter 141 is opened, the coins accumulated on the shutter 141 fall into the transport unit 15. Thus, the first storage 14 can discharge coins from the storage room S to the transport unit 15.

The transport unit 15, which transports coins discharged from the second storage 13 and the first storage 14, comprises a feeding unit 151, a transport mechanism that forms a transport path 152, and a diversion unit 153. The feeding unit 151 is configured to feed the coins discharged from the second storage 13 and the first storage 14 to the transport path 152 one at a time. The feeding unit 151, for example, comprises a storage space for holding coins and a sloped disc with one or more protrusions. By rotating the sloped disc, a coin in the storage space is caught by the protrusions, lifted, and separated, thereby feeding coins one by one to the transport path 152.

Here, the feeding unit 151 is disposed adjacent to the second storage 13. Furthermore, the feeding unit 151 is provided in contact with the underside of the first storage 14. As a result, coins discharged from the second storage 13 and the first storage 14 are directly fed into the feeding unit 151, allowing for quick feeding of coins from the second storage 13 and the first storage 14 to the transport unit 15.

The transport mechanism transports the coins fed from the feeding unit 151 along the transport path 152, based on the control of the control unit 18. In FIG. 1, the transport route of a coin transported along the transport path 152 is indicated by arrows. Specifically, the transport path 152 comprises a circulating transport path 156 that is configured in a loop shape through the first storage 14. This circulating transport path 156 is disposed so as to return coins discharged from the first storage 14 back to the first storage 14.

The circulating transport path 156 may be configured to drop a coin into the first storage 14 at point P1. That is, the circulating transport path 156 comprises a space that extends vertically between point P1 and the feeding unit 151. This vertically extending space comprises the storage room S of the first storage 14, and thus a part of the transport path 152 forms the first storage 14.

In addition, the transport path 152 comprises a diversion path 154 and a diversion path 155 that branch off from the circulating transport path 156. The diversion path 154 is disposed to connect point P2 of the circulating transport path 156 with the second storage 13, supplying coins transported by the circulating transport path 156 to the second storage 13. Furthermore, the diversion path 155 is disposed to connect point P2 of the circulating transport path 156 with the withdrawal unit 12, supplying coins transported by the circulating transport path 156 to the withdrawal unit 12. The transport mechanism can be constituted, for example, by a belt looped around a plurality of pulleys.

Based on the control of the control unit 18, the diversion unit 153 guides a coin transported along the transport path 152 to one of the circulating transport path 156, the diversion path 154, and the diversion path 155. A coin guided to the circulating transport path 156 is supplied to the first storage 14. A coin guided to the diversion path 154 is supplied to the second storage 13. A coin guided to the diversion path 155 is supplied to the withdrawal unit 12.

The recognition device 16 recognizes coins transported by the transport unit 15 and comprises a recognition unit 161 and sensing units 162 to 165. The recognition unit 161 is disposed at the circulating transport path 156 of the transport unit 15, upstream of the diversion unit and between the feeding unit 151 and the diversion unit 153. The recognition unit 161 recognizes the denomination, authenticity, and fitness of coins fed from the feeding unit 151. The recognition unit 161 can be formed from at least one of optical sensors such as cameras, magnetic sensors, and the like. Furthermore, the recognition unit 161 has the function of counting the number of coins transported by the transport unit 15.

The sensing units 162 to 165 detect coins transported by the transport unit 15 and can be formed from, for example, optical sensors. Sensing unit 162 is disposed upstream of the diversion unit 153, at the circulating transport path 156 of the transport unit 15. Sensing unit 163 is disposed downstream of the diversion unit 153, at the circulating transport path 156 of the transport unit 15. Sensing unit 164 is disposed at the diversion path 154. Sensing unit 165 is disposed at the diversion path 155.

The memory unit 17 is a memory that records various information necessary for the various operations of the coin handling apparatus 1. For example, the memory unit 17 records storage information regarding the number of coins of each denomination to be stored in the first storage 14, based on the number of coins of each denomination recognized by the recognition unit 161. Furthermore, the memory unit 17 records storage information regarding the number of coins of each denomination to be stored in the second storage 13, based on the number of coins of each denomination recognized by the recognition unit 161.

The control unit 18 comprises a processor such as a central processing unit (CPU) that controls the operations of the units and the like of the coin handling apparatus 1. For example, a program corresponding to the control unit 18 is recorded in advance in a memory, and by executing this program with hardware such as a CPU, the control unit 18 operates. By operating the control unit 18, the functions and operations of the coin handling apparatus 1 described in the present embodiment are achieved. The processing described as being executed by the coin handling apparatus 1 in the present embodiment is achieved by the control unit 18. In response to a withdrawal instruction, the control unit 18 specifies the coins to be withdrawn (hereinafter also referred to as “withdrawal target coin”) based on the recognition result of the recognition unit 161, and controls the transport unit 15 to transport the withdrawal target coins among the coins discharged from the first storage 14 to the withdrawal unit 12.

At this time, the control unit 18 executes a discharge determination to determine whether all coins have been discharged from the first storage 14, based on the number of coins of each denomination (in other word, per denomination) recognized by the recognition unit 161. When the control unit 18 determines in the discharge determination that not all coins have been discharged, the control unit 18 executes retry control by controlling the first storage 14 to open the door (shutter 141) of the storage room S again.

Furthermore, the control unit 18 controls the transport unit 15 to return the coins other than the withdrawal target to the first storage 14 based on the number of coins of each denomination recognized by the recognition unit 161.

[Configuration Example of First Storage 14]

Figure 2B:
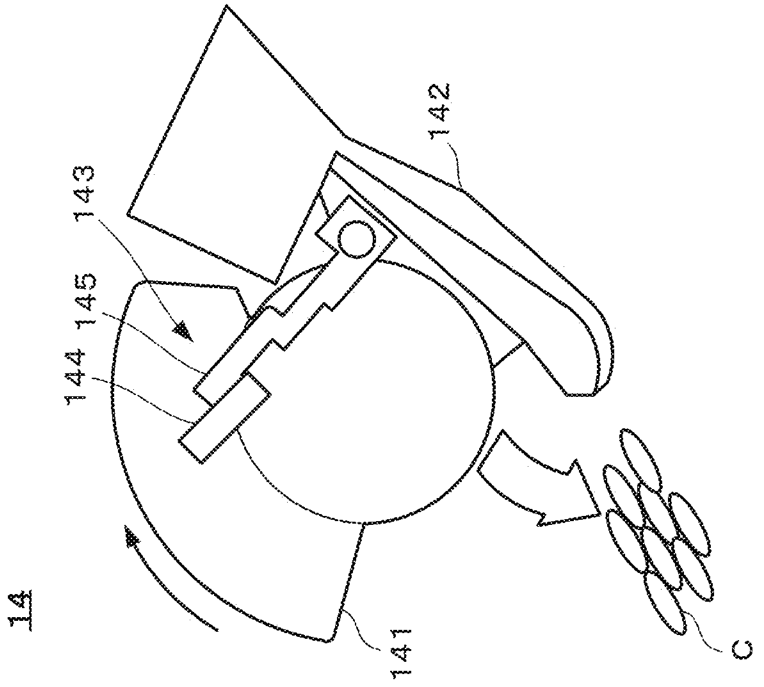
FIGS. 2A and 2B illustrate an example of the configuration of a first storage.
Figure 2A:
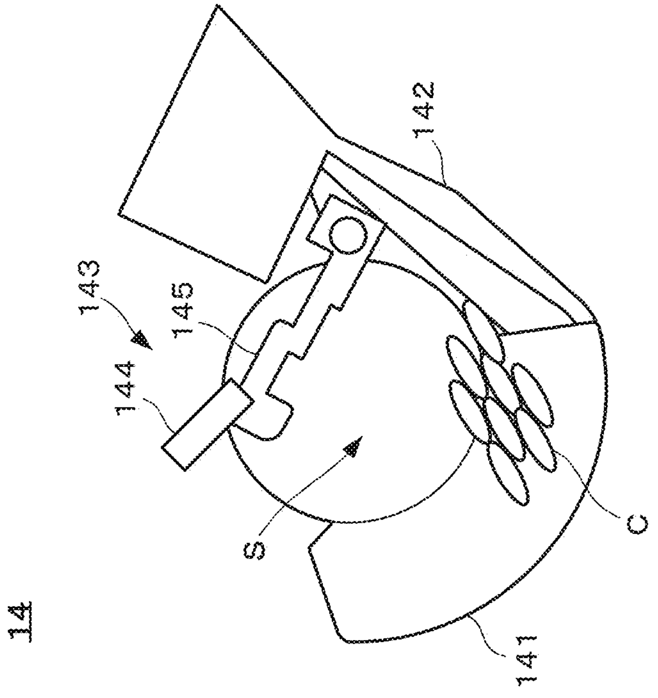

FIG. 2 illustrates an example of the configuration of the first storage 14. FIG. 2A illustrates the first storage 14 with the shutter 141 closed. FIG. 2B illustrates the first storage 14 with the shutter 141 opened.

As illustrated in FIGS. 2A and 2B, the first storage 14 comprises a storage wall 142, and the shutter 141 is rotatably provided with respect to the storage wall 142. This storage wall 142 and the shutter 141 form the storage room S inside the first storage 14. Then, the first storage 14 is opened and closed by the rotation of the shutter 141. The first storage 14 is configured to execute the opening operation of the shutter 141 (the operation of the shutter 141 from the closed state to fully opening the shutter 141) in a predetermined time. At this time, the predetermined time is, for example, set based on the opening angle of the shutter 141. When the opening operation is completed, and the control unit 18 instructs the closing operation (the operation of the shutter 141 from the opened state to completely closing the shutter 141) after a predetermined delay time has elapsed, the first storage 14 is configured to start the closing operation of the shutter 141 in response to the instruction, and to complete the closing operation in response to detection of closure by a closure detection sensor, which will be described below.

Furthermore, the first storage 14 comprises a closing sensor 143 that detects the closed state of the shutter 141. The closing sensor 143 comprises a detection unit 144 and a displacement unit 145.

The displacement unit 145 extends within the storage room S, and the base end of the displacement unit 145 is supported by the first storage 14 so that the tip of the displacement unit 145 displaces in response to the rotation of the shutter 141. That is, the displacement unit 145 is provided in such a way that the posture thereof is changed in accordance with the opening and closing of the shutter 141.

The detection unit 144 is fixed to the first storage 14 and detects the displacement of the displacement unit 145. In this configuration, the detection unit 144 is provided to be able to detect the position of the displacement unit 145 when the shutter 141 is in the closed state.

Figure 3:
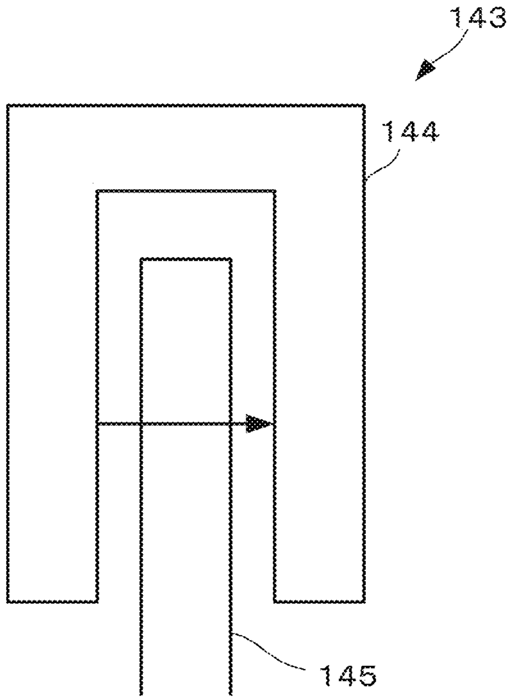
FIG. 3 illustrates an example of the configuration of a closing sensor.

For example, as illustrated in FIG. 3, the detection unit 144 may be composed of an optical sensor. Specifically, the detection unit 144 comprises a pair of opposing wall portions, and is configured to irradiate an optical sensor provided on the other wall portion with light from a light source provided on one wall portion. In addition, the tip of the displacement unit 145 is disposed between the wall portions of the detection unit 144.

In this configuration, the tip of the displacement unit 145 is disposed so that the tip moves away from the irradiation position of the light when the shutter 141 is closed, allowing the optical sensor to detect the light. In addition, when the shutter 141 is not closed, the tip of the displacement unit 145 coincides with the irradiation position of the light so that the light is not detected by the optical sensor. Then, when the light is detected by the optical sensor, the detection unit 144 outputs a detection signal indicating that the light has been detected to the control unit 18.

With such a configuration, the control unit 18 can detect the operation time of the closing operation of the shutter 141 from the start of the closing operation to the closure of the shutter 141, that is, the time from the instruction to start the closing operation until the closing sensor 143 detects the transmission of light, based on the detection signal of the closing sensor 143.

[Withdrawal Preparation Operation]

Figure 4:
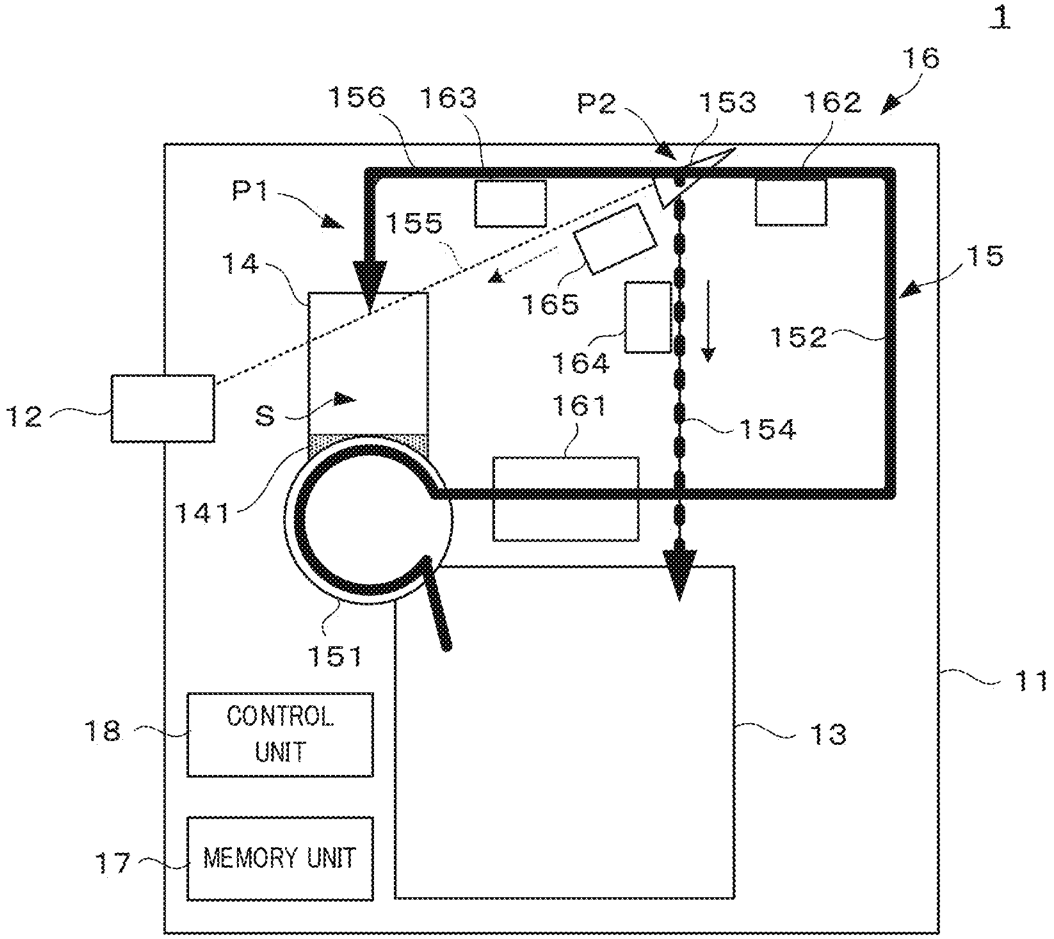
FIG. 4 illustrates an example of how coins move inside the coin handling apparatus during a withdrawal preparation operation.

Next, the withdrawal preparation operation for replenishing the first storage 14 with coins from the second storage 13 will be described. FIG. 4 illustrates how coins C move inside the coin handling apparatus 1 during the withdrawal preparation operation. This withdrawal preparation operation is, for example, an operation of replenishing the first storage 14 with coins C in preparation for the next withdrawal after coins have been dispensed from the first storage 14.

First, when coins C stored in the first storage 14 are dispensed from the withdrawal unit 12, for example, the control unit 18 controls the second storage 13 to discharge coins C stored in the second storage 13 to the feeding unit 151. At this time, the second storage 13 discharges coins randomly from the coins C stored. That is, it is expected that the number of coins C of each denomination discharged by the second storage 13 varies with each withdrawal preparation operation.

Subsequently, the coins C discharged from the second storage 13 are fed one by one onto the transport path 152 by the feeding unit 151 and transported along the transport path 152 by the transport mechanism. Then, the recognition unit 161 recognizes the coin C transported by the transport mechanism. The recognition unit 161 outputs the recognition result of the coin C to the control unit 18. At this time, the sensing unit 162 may detect coin C just before the diversion unit 153. When the sensing unit 162 detects a coin C, the sensing unit 162 outputs the detection result to the control unit 18.

The memory unit 17 has (recorded therein in advance) the number of coins C, by each denomination, to be stored in the first storage 14 during the withdrawal preparation operation. For example, the memory unit 17 can store in advance the number of coins C, by each denomination, which can make up a specified amount of change. That is, the memory unit 17 has (recorded therein in advance) the number of coins by each denomination, such as 4 one-yen coins, 1 five-yen coin, 4 ten-yen coins, 1 fifty-yen coin, 4 one-hundred yen coins, and 1 five-hundred yen coin.

By storing coins C in advance at the number recorded in the memory unit 17 in the first storage 14, it is possible to appropriately combine the denomination and number of coins C to prepare coins C of any amount from 1 yen to 999 yen.

The control unit 18 executes withdrawal preparation control to control the transport unit 15 so that coins C are stored in the first storage 14 at the number by each denomination recorded in advance in the memory unit 17, based on the recognition result of the recognition unit 161. For example, when the recognition unit 161 recognizes a coin C, the control unit 18 decides whether to store the recognized coin C in the first storage 14 based on the number of coins C of each denomination to be stored in the first storage 14 recorded in advance in the memory unit 17.

The control unit 18 controls the diversion unit 153 to guide a coin C, which is decided to be stored in the first storage 14, to the circulating transport path 156. Furthermore, the control unit 18 controls the diversion unit 153 to guide a coin C, which is decided not to be stored in the first storage 14, to the diversion path 154. At this time, the control unit 18 may specify coins C to be guided to the circulating transport path 156 or the diversion path 154 based on the detection results detected by the sensing unit 162, and control the diversion unit 153 based on the specifying results.

As a result, the coin C guided to the circulating transport path 156 is stored in the first storage 14. On the other hand, the coin C guided to the diversion path 154 is stored in the second storage 13. Thus, in the withdrawal preparation operation, by storing in the first storage 14 the coins C at the number by each denomination recorded in advance in the memory unit 17, it is possible to quickly dispense the coins C according to the withdrawal instruction.

The control unit 18 may update storage information 19 regarding the number of coins C of each denomination recorded in the memory unit 17 based on the number of coins C of each denomination recognized by the recognition unit 161 during the withdrawal operation and the withdrawal preparation operation. FIG. 5 illustrates an example of the storage information 19 of coins recorded in the memory unit 17.

In FIG. 5, it is illustrated that at 15:00, a withdrawal preparation operation was executed to store a specified number of coins in the first storage 14: 4 one-yen coins, 1 five-yen coin, 4 ten-yen coins, 1 fifty-yen coin, 4 one-hundred yen coins, and 1 five-hundred yen coin. In addition, at 15:30, one five-hundred yen coin is dispensed from the first storage 14, and at 15:31, a withdrawal preparation operation is executed to replenish the first storage 14 with one five-hundred yen coin. Thus, the coin handling apparatus 1 can accurately manage the number of coins C to be stored in the first storage 14 based on the storage information 19.

At this time, the control unit 18 can also update the storage information 19 regarding the number of coins C of each denomination stored in the second storage 13, in a similar manner to the first storage 14, based on the recognition results of the recognition unit 161. Furthermore, the control unit 18 may specify the coins C supplied to the first storage 14, the second storage 13, or the withdrawal unit 12 based on the detection results detected by the sensing units 163 to 165, and update the storage information 19 based on the specifying results. The storage information 19 only needs to indicate the denomination and the number of coins of each denomination currently stored in the first storage 14 and the second storage 13. That is, the storage information 19 does not need to comprise the date or information about operations.

[Withdrawal Operation]

Figure 6:
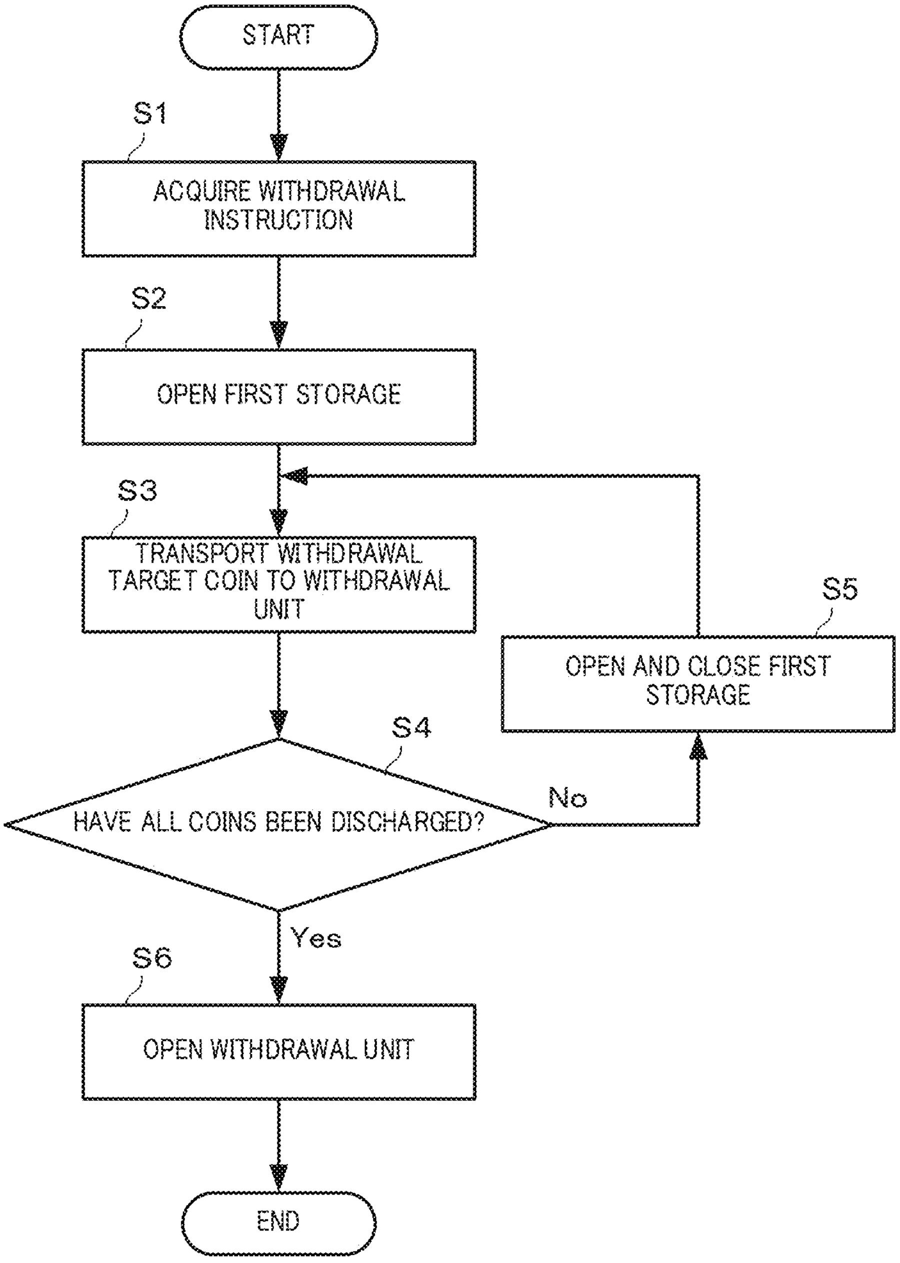
FIG. 6 is a flowchart illustrating a withdrawal operation of Embodiment 1.
Figure 7:
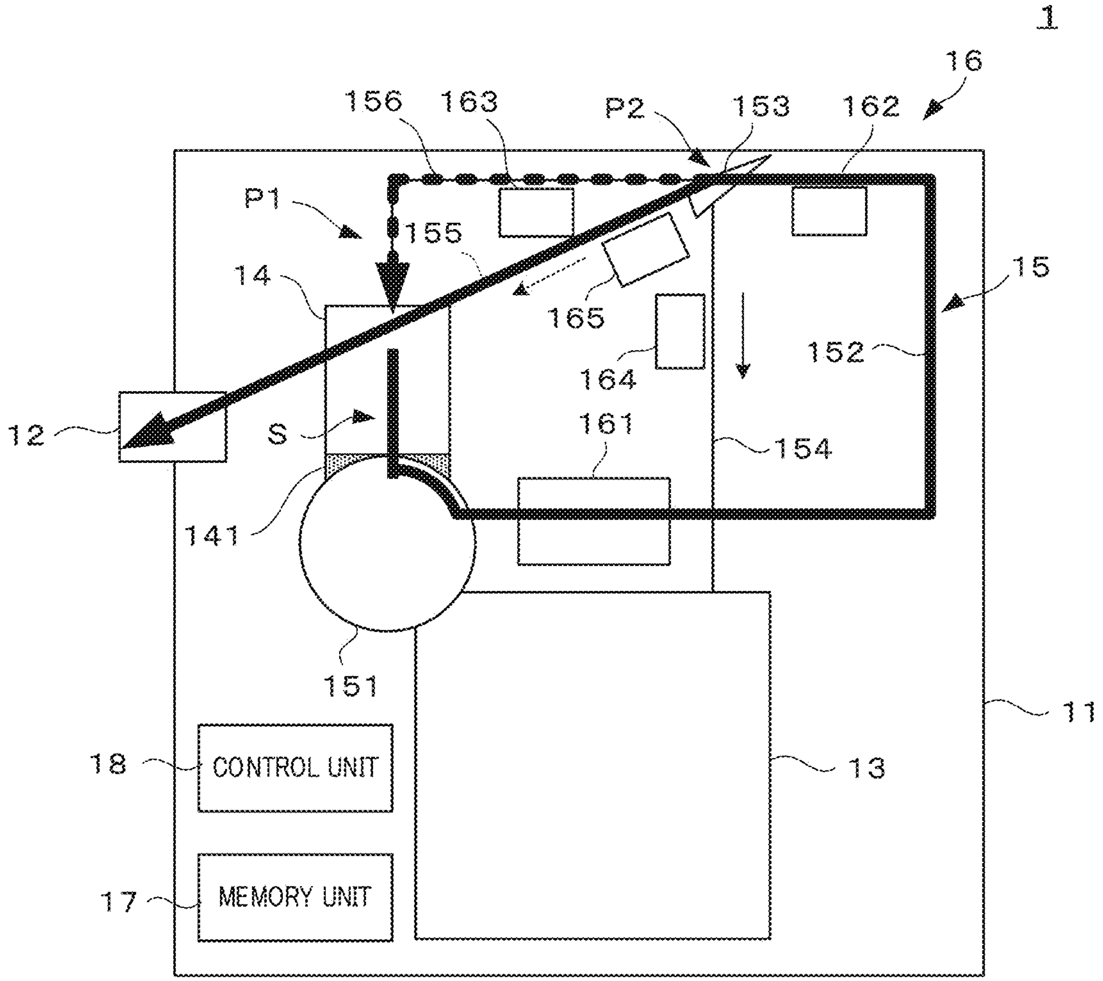
FIG. 7 illustrates an example of how coins move inside the coin handling apparatus during a withdrawal operation.

Next, referring to the flowchart in FIG. 6, the withdrawal operation for dispensing the coins C stored in the first storage 14 by the withdrawal preparation operation will be described. Furthermore, FIG. 7 illustrates how coins C move inside the coin handling apparatus 1 during the withdrawal operation.

First, the control unit 18 acquires a withdrawal instruction from, for example, an external input device in step S1. The withdrawal instruction can comprise, for example, the withdrawal target amount, the type of withdrawal (such as change, exchange, reconciliation, or collection). At this time, the first storage 14 is in a state where the shutter 141 is closed as illustrated in FIG. 2A, and the coins C stored by the withdrawal preparation operation are stored in the storage room S.

Upon acquiring the withdrawal instruction, the control unit 18 controls the first storage 14 to open the door of the storage room S in step S2. That is, the control unit 18 controls the first storage 14 to open the shutter 141. As a result, the coins C stored in the first storage 14 are discharged as illustrated in FIG. 2B.

Proceeding to step S3, the control unit 18 starts the withdrawal operation to transport withdrawal target coins C to the withdrawal unit 12. Specifically, the coins C discharged from the first storage 14 are supplied to the feeding unit 151. The first storage 14 is provided above the feeding unit 151, and thus the coins C can be easily discharged to the feeding unit 151 by simply opening the shutter 141.

When the coins C are discharged from the first storage 14, the feeding unit 151 feeds the coins C one by one onto the transport path 152. Then, the recognition unit 161 recognizes the coins C being transported along the transport path 152.

Based on the recognition results by the recognition unit 161, the control unit 18 selectively transports the coin C to either the first storage 14 or the withdrawal unit 12. Specifically, the control unit 18 determines whether to dispense each recognized coin C and controls the diversion unit 153 to guide a withdrawal target coin C to the diversion path 155. As a result, the withdrawal target coin Cis transported to the withdrawal unit 12. Furthermore, the control unit 18 controls the diversion unit 153 to guide a coin C that is not the withdrawal target to the circulating transport path 156. As a result, the coin C, which is not the withdrawal target, is returned to the first storage 14.

Next, the control unit 18 proceeds to step S4 and executes a discharge determination to decide whether all the coins C have been discharged from the first storage 14 based on the recognized number of coins C of each denomination by the recognition unit 161.

For example, the control unit 18 can determine that not all coins C have been discharged in the discharge determination when the number of coins C of each denomination recognized by the recognition unit 161 differs from the number of coins C of the corresponding denomination to be stored in the first storage 14 as recorded in the memory unit 17. Specifically, the control unit 18 determines that not all coins C have been discharged when the latest recorded number of coins at 15:31 in the storage information 19 illustrated in FIG. 5 differs from the number recognized by the recognition unit 161.

When the control unit 18 determines that not all coins C have been discharged from the first storage 14, the control unit 18 proceeds to step S5 to execute retry control of the first storage 14 to open the shutter 141 again. Then, the control unit 18 repeats the processing of steps S3, S4, and S5 until all coins C are discharged from the first storage 14. The discharge determination of step S4 is executed in parallel with the withdrawal operation of step S3. Furthermore, in step S4, even when it is determined that not all coins have been discharged from the first storage 14, it may proceed to step S6 when the amount of withdrawal target money is being transported to the withdrawal unit 12. In that case, the control unit 18 causes the memory unit 17 to record information that the storage information 19 of the first storage 14 is in an indeterminate state. For example, the control unit 18 may set a reconciliation required flag in the storage information 19 to execute the reconciliation of the balance at a predetermined timing. In addition, in the withdrawal preparation operation for the next withdrawal, when coins of the withdrawn denomination at the number per denomination are transported from the second storage 13 to the first storage 14, it is assumed that the specified coins are stored in the first storage 14.

When the control unit 18 determines in step S4 that all coins C have been discharged from the first storage 14, the control unit 18 proceeds to step S6 to open the shutter of the withdrawal unit 12, making it possible to remove coins C to the outside of the apparatus, thereby completing the withdrawal operation.

In this manner, in response to a withdrawal instruction, the control unit 18 controls the first storage 14 to open the shutter 141 and, based on the recognition results by the recognition unit 161, controls the transport unit 15 to transport the withdrawal target coins C, among the coins having been discharged from the first storage 14, to the withdrawal unit 12. When the control unit 18 determines in the withdrawal control that not all coins C have been discharged from the first storage 14 based on the number of coins C of each denomination recognized by the recognition unit 161, the control unit 18 executes retry control of the first storage 14 to open the shutter 141 again. As a result, the coin handling apparatus 1 can easily reduce the remaining of coins C in the first storage 14.

Furthermore, the control unit 18 determines that not all coins C have been discharged in the discharge determination when the number of coins C of each denomination recognized by the recognition unit 161 differs from the number of coins C stored as recorded in the memory unit 17. Therefore, the coin handling apparatus 1 can sense the remaining of coins C in the first storage 14.

Then, when executing the withdrawal control, the control unit 18 causes the memory unit 17 to record the storage information 19 regarding the number of coins stored in the first storage 14, based on the number of withdrawal target coins C of each denomination. Thus, the coin handling apparatus 1 can properly manage the number of coins C stored in the first storage 14.

According to the present embodiment, when the control unit 18 determines in the withdrawal control that not all coins C have been discharged from the first storage 14 based on the number of each denomination of coins C recognized by the recognition unit 161, the control unit 18 executes a retry control to open the shutter 141 again. Thus, the coin handling apparatus 1 can easily reduce the remaining of coins C in the first storage 14.

Embodiment 2

Figure 8:
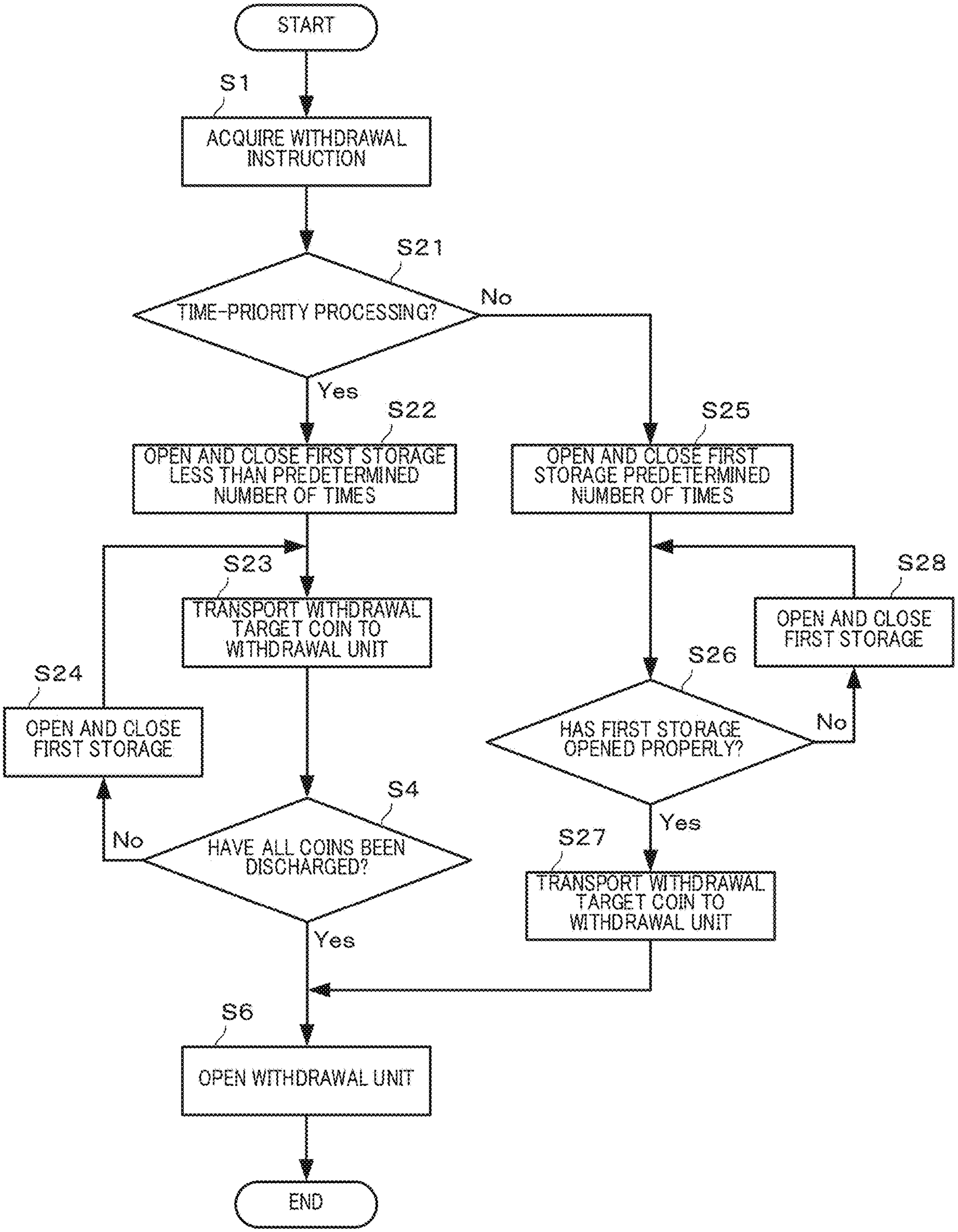
FIG. 8 is a flowchart illustrating a withdrawal operation of Embodiment 2.

In Embodiment 2, the control unit 18 changes the withdrawal control according to the type of withdrawal (e.g., change, exchange, reconciliation, or collection). For example, the control unit 18 changes the withdrawal control depending on whether the withdrawal instruction corresponds to time-priority processing that prioritizes withdrawal time. The configuration and functions of the coin handling apparatus are the same as those illustrated in FIG. 1, and the differences from the configuration and functions of Embodiment 1 are explained in detail with reference to the flowchart of the withdrawal operation in FIG. 8.

First, in a similar manner to Embodiment 1, the control unit 18 acquires a withdrawal instruction from, for example, an external input device in step S1. Here, the memory unit 17 has registered in advance the types of withdrawals (e.g., change, exchange, reconciliation, or collection) that can be entered as withdrawal instructions from an external input device, and these withdrawal instructions are classified into time-priority processing and accuracy-priority processing.

The time-priority processing prioritizes withdrawal time over accuracy-priority processing and allows for withdrawals in a shorter time than the accuracy-priority processing. In addition, the accuracy-priority processing prioritizes the accuracy of the withdrawal process over the time-priority processing, and although it takes longer than the time-priority processing, it allows for withdrawals with high accuracy.

For example, a withdrawal instruction corresponding to the time-priority processing can comprise a withdrawal instruction from a user (e.g., customers of stores) such as for change or exchange. In addition, a withdrawal instruction corresponding to the accuracy-priority processing can comprise a withdrawal instruction from an administrator (e.g., of stores) such as for reconciliation or collection.

When the control unit 18 acquires a withdrawal instruction, the control unit 18 executes a priority determination in step S21 to determine whether the withdrawal instruction corresponds to the time-priority processing, which prioritizes withdrawal time. In this manner, the control unit 18 can change the withdrawal control depending on whether the withdrawal instruction corresponds to the time-priority processing.

Specifically, when the control unit 18 determines that the withdrawal instruction corresponds to the time-priority processing, the control unit 18 proceeds to step S22 and controls the first storage 14 to open the door (shutter 141) of the storage room S fewer times (e.g., once) than when the control unit 18 determines that the withdrawal instruction does not correspond to the time-priority processing.

Subsequently, proceeding to step S23, the control unit 18 starts the withdrawal operation to transport the withdrawal target coins C to the withdrawal unit 12.

In parallel with step S23, the control unit 18 executes a discharge determination in step S4 to determine whether all coins C have been discharged from the first storage 14 based on the number of each denomination of coins C recognized by the recognition unit 161.

For example, the control unit 18 may determine in the discharge determination that not all coins C have been discharged when the number of each denomination of coins C recognized by the recognition unit 161 differs from the number of the corresponding denomination of coins C to be stored in the first storage 14 as recorded in the memory unit 17.

When the control unit 18 determines that all coins C have been discharged from the first storage 14, the control unit 18 proceeds to step S6, opens the shutter of the withdrawal unit 12 to allow the coins C to be taken out to the outside of the apparatus, and completes the withdrawal operation. Thus, the coin handling apparatus 1 can quickly dispense coins C while managing the coins C appropriately.

On the other hand, when the control unit 18 determines that not all coins C have been discharged from the first storage 14, the control unit 18 proceeds to step S24 to execute retry control of the first storage 14 to open the shutter 141 again. The control unit 18 repeats the processing of steps S23, S4, and S24 until all coins C are discharged from the first storage 14.

Furthermore, when the control unit 18 determines that not all coins C have been discharged from the first storage 14 in the determining in the discharge determination of step S4, the control unit 18 can further determine whether the number of withdrawal target coins C of each denomination corresponds to the amount corresponding to the withdrawal instruction, based on the determination result of the recognition unit 161.

The control unit 18 may proceed to step S24 to execute retry control of the first storage 14 to open the shutter 141 again when the control unit 18 determines that the number of withdrawal target coins C of each denomination does not correspond to the amount specified in the withdrawal instruction. On the other hand, when the control unit 18 determines that the number of withdrawal target coins C of each denomination corresponds to the amount specified in the withdrawal instruction, the control unit 18 may proceed directly to step S6 without executing retry control (without proceeding to step S24), open the shutter of the withdrawal unit 12 to allow the coins C to be taken out to the outside of the apparatus, and complete the withdrawal operation. In this manner, the control unit 18 can complete the withdrawal operation without executing the retry control when the withdrawal target coins C, which correspond to the withdrawal instruction, are being transported to the withdrawal unit 12. As a result, the coin handling apparatus 1 can quickly dispense coins C at an amount corresponding to the withdrawal instruction.

At this time, the control unit 18 may associate information indicating that the number of coins C of each denomination being managed is unclear to the relevant part of the storage information 19, due to the possibility that the number may be unclear.

For example, when the control unit 18 determines that not all coins C have been discharged from the first storage 14 in the withdrawal control at 15:30, the control unit 18 may associate a reconciliation required flag indicating that the balance in the first storage 14 needs to be subjected to reconciliation by an administrator. In this manner, during the withdrawal control, when the control unit 18 determines that not all coins C have been discharged from the first storage 14 and that the number of withdrawal target coins C of each denomination corresponds to the amount in the withdrawal instruction, the control unit 18 can associate a reconciliation required flag to the relevant part of the storage information 19. As a result, the control unit 18 can output information indicating the need for reconciliation when the administrator connects an external output device.

Furthermore, even when the control unit 18 associates a reconciliation required flag to the storage information 19, the control unit 18 may execute the withdrawal preparation operation described in FIG. 4 of Embodiment 1 after the coins C are dispensed in step S6.

In step S21, when the control unit 18 determines that the withdrawal instruction does not correspond to the time-priority processing, the control unit 18 proceeds to step S25 to control the first storage 14 to open the door of the storage room S a predetermined number of times (e.g., a plurality of times), which is set higher than when the withdrawal instruction is determined to correspond to the time-priority processing. Thus, the coin handling apparatus 1 can reliably discharge coins C from the first storage 14 in response to a withdrawal instruction that prioritizes accuracy.

Figure 9:
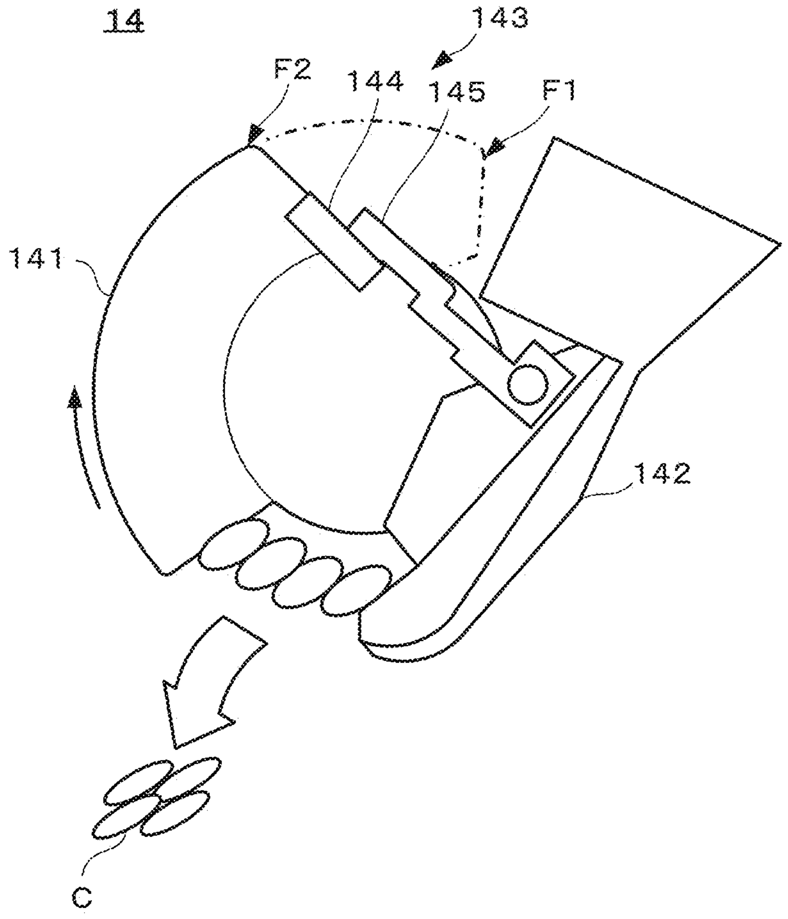
FIG. 9 illustrates an example of the first storage not opening properly.

However, even when the shutter 141 is opened in step S25, not all coins C are discharged from the first storage 14 in some cases. For example, as illustrated in FIG. 9, when the shutter 141 does not open completely, that is, when the shutter 141 stops at an intermediate position F2 instead of the fully open position F1, there is a risk that not all coins C are discharged.

Therefore, the control unit 18 determines in step S26 whether the door of the first storage 14 is half-open based on the closing time of the door of the first storage 14 (the time from when the closing instruction for the door of the first storage 14 is issued until the door closes). For example, the control unit 18 determines that the door of the first storage 14 is half-open based on the closing time detected by the closing sensor 143.

Specifically, the first storage 14 is configured to perform the closing operation of the door of the storage room S until the closing sensor 143 detects closure when the first storage 14 is instructed by the control unit 18. Furthermore, the memory unit 17 has a threshold (recorded therein in advance) for determining whether the door of the first storage 14 is properly opened or closed, which is set based on a predetermined time from when the door of the first storage 14 opens until the door fully closes.

The control unit 18 reads the threshold information from the memory unit 17 and determines that the door of the first storage 14 is not properly opened (half-open) when the closing time of the first storage 14 from the start of the closing operation until the closed state is detected by the closing sensor 143 is less than the threshold. In this manner, the control unit 18 can determine whether the door of the first storage 14 has opened properly.

When the control unit 18 determines that the first storage 14 has opened properly, the control unit 18 proceeds to step S27 and executes a withdrawal operation to transport the withdrawal target coins C to the withdrawal unit 12. Then, the control unit 18 opens the shutter of the withdrawal unit 12 in step S6 to withdraw the withdrawal target coins C. The half-open determination in step S26 may be executed in parallel with the withdrawal operation in step S27.

On the other hand, when the control unit 18 determines that the first storage 14 has not opened properly, it proceeds to step S28 and executes retry control of the first storage 14 to open the shutter 141 again. Then, the control unit 18 repeats the processing of steps S26 and S28 until the first storage 14 opens properly. In this manner, the coin handling apparatus 1 can reliably manage the coins C stored while ensuring that coins C are reliably discharged from the first storage 14.

According to the present embodiment, the control unit 18 changes the withdrawal control depending on whether the withdrawal instruction corresponds to a time-priority processing instruction set in advance. Therefore, the coin handling apparatus 1 can reduce unnecessary operations in withdrawals in the case of the time-priority processing, and prevent coins C from remaining in the first storage 14 in the case of not the time-priority processing.

The control unit 18 may execute the half-open determination in the case of the time-priority processing. In that case, the control unit 18 may execute the discharge determination regardless of the result of the half-open determination (ignoring the result of the half-open determination). For example, the control unit 18 may execute the half-open determination in parallel with step S23 before step S4. When the control unit 18 determines that the first storage 14 has opened properly in the half-open determination, the control unit 18 proceeds to step S6, opens the shutter of the withdrawal unit 12, and completes the withdrawal operation. On the other hand, when the control unit 18 determines that the first storage 14 has opened properly in the half-open determination, the control unit 18 can proceed to step S4 and execute the discharge determination.

In Embodiment 2, when the control unit 18 associates information indicating that the number of coins C of each denomination is unclear in step S4 to the storage information 19, the control unit 18 opens the shutter of the withdrawal unit 12 to complete the withdrawal operation; however, the present embodiment is not limited to this configuration. For example, when the control unit 18 associates the information to the storage information 19, the control unit 18 may proceed to step S24 and execute the retry control of the first storage 14 to open the shutter 141 again.

Furthermore, in the above embodiment, the control unit 18 determines whether all coins C have been discharged from the first storage 14 based on the number of each denomination of coins C recognized by the recognition unit 161; however, the present embodiment is not limited to this configuration. For example, the control unit 18 may determine whether all coins C have been discharged from the first storage 14 based on the number of coins C, when only the same type of coins C are stored in the first storage 14.

In addition, in the above embodiment, it is not necessary to classify the type of withdrawal (e.g., change, exchange, reconciliation, or collection) into the time-priority processing and accuracy-priority processing. For example, the memory unit 17 may have recorded therein the type of withdrawal (e.g., change, exchange, reconciliation, or collection) associated to the number of times the door of the first storage is opened and closed, the conditions for retry determination, and the like. In this manner, the control unit 18 can refer to the memory unit 17 based on the type of withdrawal and directly select the number of door is opened and closed in steps S22 and S25, and the determination conditions in steps S4 and S27.

Furthermore, in the above embodiment, the withdrawal instruction does not have to comprise the type of withdrawal (e.g., change, exchange, reconciliation, or collection). For example, after a menu such as settlement, exchange, reconciliation, or collection has been selected, the control unit 18 may acquire a withdrawal instruction comprising the withdrawal amount in advance. In that case, the control unit 18 may determine the type of withdrawal or the content of withdrawal control according to the selected menu.

Moreover, in the above embodiment, the memory unit 17 and the control unit 18 are disposed within the coin handling apparatus 1; however, the present embodiment is not limited to this configuration. For example, at least one of the memory unit 17 and the control unit 18 may be disposed in a cloud server or the like, connected to the coin handling apparatus 1 via a network, and the functions of the coin handling apparatus 1 may be achieved by exchanging information or messages.

The functions provided by the configurations described herein may be implemented in one or more electrical or processing circuits, comprising one or more general purpose processors, application specific processors, integrated circuits, application specific integrated circuits (ASICs), central processing units (CPUs), conventional circuits, and/or combinations thereof, programmed to provide the functions. A processor may be an electrical or processing circuit comprising transistors or other circuits. The type of processor is not particularly limited as long as it can execute programs stored in memory.

The configurations described herein may be hardware that realizes the functions and operations described, or hardware programmed to provide the functions and operations described. For example, when hardware is considered as an electrical circuit or processing circuit, the hardware may comprise a processor and a software program to provide the functions and configurations of the hardware. For example, when hardware comprises physical structures such as components and drive units, the hardware may also comprise a processor and a software program, in addition to the physical structure, to control the operation of the physical structure and provide the functions and configurations of the hardware. Each configuration described herein is an example of hardware, and the configurations may be provided using other hardware capable of providing the functions and operations described herein.

The invention claimed is:

1. A coin handling apparatus, comprising:

a first storage that stores one or more coins, comprises a door configured to be opened and closed, and discharges the stored one or more coins by opening the door;

a transport unit that transports the one or more coins discharged from the first storage;

a recognition unit that recognizes the one or more coins transported by the transport unit; and a control unit that, in response to receiving a withdrawal instruction, executes withdrawal control to open the door, and based on a recognition result by the recognition unit, to control the transport unit to transport one or more withdrawal target coins to a withdrawal unit, the one or more withdrawal target coins being among the one or more coins discharged from the first storage, wherein when the control unit determines in the withdrawal control that not all of the one or more coins have been discharged from the first storage based on the number of the one or more coins recognized by the recognition unit, the control unit executes retry control to open the door again.

2. The coin handling apparatus according to claim 1, wherein the control unit determines that not all of the one or more coins have been discharged from the first storage based on the number of the one or more coins recognized by the recognition unit per denomination.

3. The coin handling apparatus according to claim 1, further comprising:

a memory unit that records information regarding the number of coins to be stored in the first storage, wherein when the number of the one or more coins recognized by the recognition unit differs from the number of coins recorded in the memory unit, the control unit determines that not all of the one or more coins have been discharged.

4. The coin handling apparatus according to claim 3, wherein when the control unit executes the withdrawal control, the control unit records, in the memory unit, information regarding the number of the one or more coins stored in the first storage based on the number of the one or more withdrawal target coins.

5. The coin handling apparatus according to claim 3, further comprising:

a second storage that stores the one or more coins, wherein:

the control unit executes withdrawal preparation control to discharge a coin among the one or more coins from the second storage to the transport unit and to control the transport unit based on the recognition result by the recognition unit such that a predetermined number of coins are stored in the first storage, and when the withdrawal preparation control is executed, the memory unit records information regarding the number of the one or more coins stored in the first storage based on the number of the one or more coins recognized by the recognition unit.

6. The coin handling apparatus according to claim 1, wherein the control unit detects an operation time of a closing operation for closing the door.

7. The coin handling apparatus according to claim 1, wherein:

the transport unit comprises a transport path for transporting the one or more coins, and a feeding unit that feeds the one or more coins to the transport path; and the first storage is provided above the feeding unit.

8. The coin handling apparatus according to claim 1, wherein the control unit changes the withdrawal control depending on whether the withdrawal instruction corresponds to a time-priority processing instruction set in advance.

9. The coin handling apparatus according to claim 8, wherein the control unit sets a fewer number of times for opening and closing the first storage when the withdrawal instruction corresponds to the time-priority processing instruction than when the withdrawal instruction does not correspond to the time-priority processing instruction.

10. The coin handling apparatus according to claim 8, wherein the control unit determines whether the door of the first storage has opened properly based on a closing time for closing the door.

11. The coin handling apparatus according to claim 10, wherein when the control unit determines that the withdrawal instruction does not correspond to the time-priority processing instruction and that the door of the first storage has not opened properly, the control unit executes the retry control.

12. The coin handling apparatus according to claim 1, wherein during the withdrawal control, when the control unit determines that not all of the one or more coins have been discharged from the first storage, the control unit does not execute the retry control when the one or more withdrawal target coins have been transported to the withdrawal unit.

13. The coin handling apparatus according to claim 3, wherein during the withdrawal control, when the control unit determines that not all of the one or more coins have been discharged from the first storage and that the number of the one or more withdrawal target coins that have been transported to the withdrawal unit corresponds to an amount in the withdrawal instruction, the control unit associates information indicating that the number of the one or more coins is unclear to the information regarding the number of coins recorded in the memory unit.

14. A coin handling method to be executed by a coin handling apparatus, the coin handling method comprising:

opening a door of a storage storing one or more coins to discharge the one or more coins from the storage, in response to receiving a withdrawal instruction;

transporting by a transport unit the one or more coins discharged from the storage;

recognizing by a recognition unit the one or more coins transported by the transport unit;

opening the door again when not all of the one or more coins have been discharged from the storage based on the number of the one or more coins recognized by the recognition unit; and transporting a withdrawal target coin to a withdrawal unit by the transport unit based on a recognition result by the recognition unit, the withdrawal target coin being among the one or more coins discharged from the storage.

* * * * *